United States Patent Office 3,023,349
Patented Feb. 27, 1962

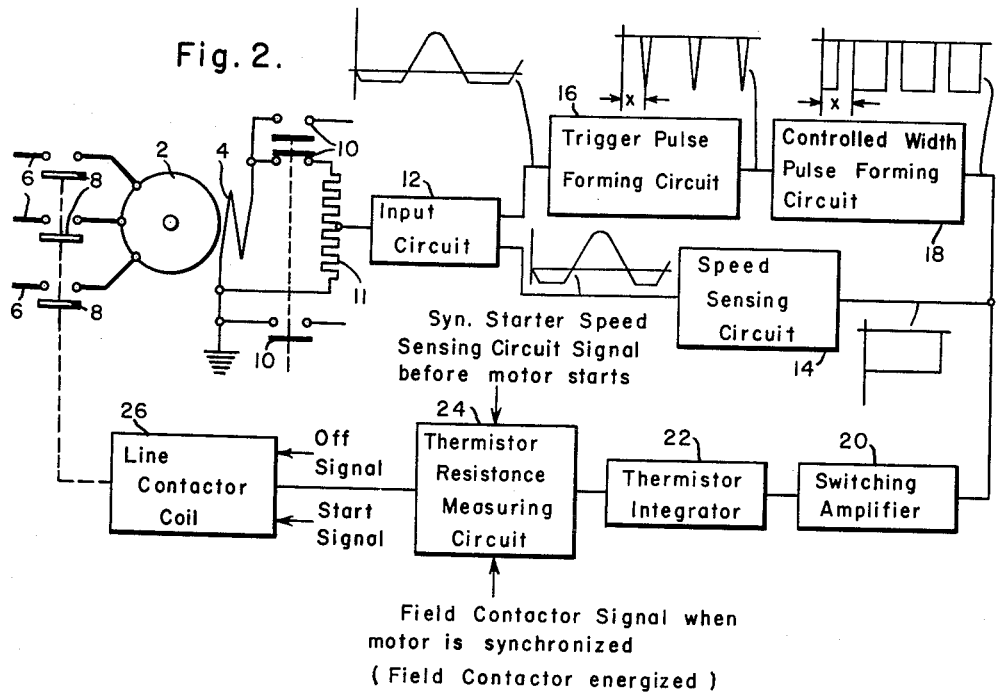
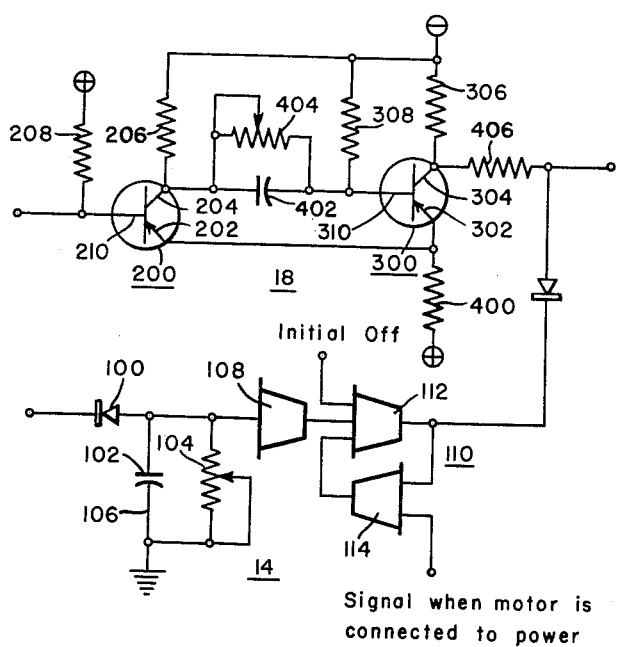

3,023,349
SYNCHRONOUS MOTOR CONTROL
Dean J. MacGregor, Amherst, N.Y., assignor to Westinghouse Electric Corporation, East Pittsburgh, Pa., a corporation of Pennsylvania
Filed June 25, 1959, Ser. No. 822,955
8 Claims. (Cl. 318—170)

The present invention relates generally to synchronous motor controls, and more particularly to a system of control for damper winding protection of a synchronous alternating current motor.

The present invention is an improvement in the system of control for protection of the damper winding of a synchronous motor as described and claimed in my copending application, Serial No. 821,601, filed June 19, 1959, and assigned to the same assignee as the present invention. The present invention allows the more accurate simulation of the damper winding heating characteristics than previously obtainable by any other known circuit.

An object of the present invention is to provide a damper winding protection scheme for a synchronous motor which allows maximum use of the motor capabilities by a more accurate simulation of its damper winding heating characteristics.

Another object of this invention is to provide a damper winding protection scheme for a synchronous motor which is extremely reliable through the use of static devices requiring little or no maintenance.

Another object of this invention is to provide a damper winding protection scheme for a synchronous motor capable of indirectly sensing the temperature of the damper winding.

Another object of this invention is to provide a damper winding protection scheme for a synchronous motor adaptable to motors of varying design, having different damper current versus frequency characteristics and to different starting conditions.

Further objects and advantages of the invention will be readily apparent from the following detailed description taken in conjunction with the drawing, in which:

FIG. 2 is a block diagram of an illustrative embodiment of this invention; and,

FIG. 3 is an electrical schematic diagram of the invention.

Figure 1:
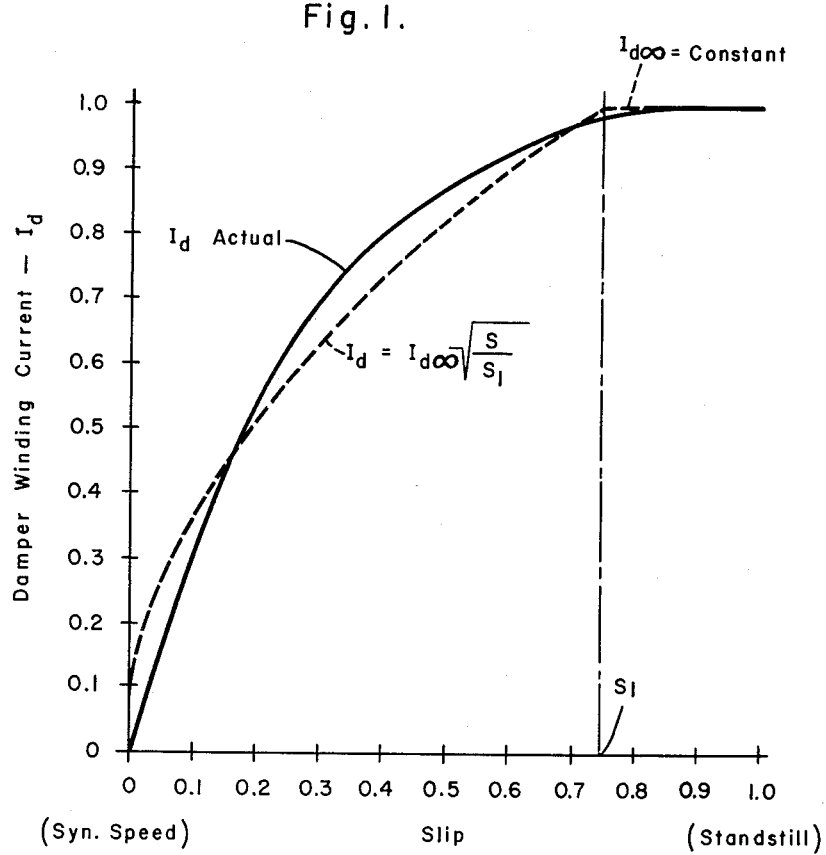
FIGURE 1 is a graphical representation of the actual damper winding current shown with a solid line and the simulated damper winding current accomplished by the present invention shown with a dotted line.

The current induced in the damper winding during acceleration of the synchronous motor follows a complex curve $I_d$ actual as indicated in FIG. 1. The actual damper winding current can be approximated by a curve having two distinct portions; a constant value of current $I_{d\infty}$ from standstill to a selected value of slip, $S_1$, and a second portion from the selected slip $S_1$ to near synchronous speed represented by a value $$I_{d\infty}\sqrt{\frac{S}{S_1}}$$

"S" being representative of the slip at any particular moment and "$S_1$" representative of a preselected value of slip.

The total heat loss in the damper winding during the starting period can be shown to be represented:

$$Q = I^2_{d\infty}Rt_1 + I^2_dRt_2$$

where Q is the total heat loss in the damper winding during the starting period, R is the resistance of the damper winding and $t_1$ is the time interval during which the motor is accelerated from standstill to the preselected slip $S_1$ and $t_2$ is the time interval during which the motor accelerates further from the selected slip $S_1$ to near synchronous speed.

The time per cycle of slip frequency equals $$\frac{1}{Sf_0}$$

where S is the slip and $f_0$ is line frequency. If the number of cycles of slip frequency which occur while the motor is accelerating from the selected slip value $S_1$ to near synchronous speed is $N_2$, then the time interval during which the motor accelerates from the selected slip $S_1$ to near synchronous speed can be shown as $$t_2 = \frac{1}{Sf_0}N_2$$

The second portion of the equation representing the total heat loss in the damper winding during the starting period then becomes:

$$I^2_dRt_2 = I^2_{d\infty}\left(\frac{S}{S_1}\right)R\left(\frac{N_2}{Sf_0}\right) = \frac{I^2_{d\infty}}{f_0}R\left(\frac{N_2}{S_1}\right)$$

The entire equation therefore becomes:

$$Q = I^2_{d\infty}R\left[t_1 + \frac{N_2}{f_0S_1}\right] \qquad (1)$$

From FIG. 1 it can be seen that the foregoing equation allows a close approximation of the actual current flow in the damper winding. The total allowable locked rotor time that a particular synchronous motor can safely withstand is known by the motor designer. The value of the preselected slip $S_1$ is arbitrary, but a value between 2.0 and 2.5 times the slip at which maximum torque occurs results in an excellent approximation of the damper winding current.

The damper winding protection system embodying the invention is shown in FIG. 2. A synchronous motor 2, having a field winding 4, is connected to power lines 6 by means of the line contactor 8. The field winding 4 is adapted to be connected across a source of direct current excitation by means of the field contactor 10. The frequency of the current in the damper winding is the same during the starting of the synchronous motor as the frequency of the field current. This is because both currents result from the voltage induced by the rotor moving through the field produced by the stator. Therefore, a measure of the frequency of the current in the damper winding may be obtained by a measurement of the of the slip frequency from the motor field circuit. One such circuit is as described and claimed in my previously mentioned copending application.

Referring to FIG. 2, an input circuit 12 is connected to the discharge resistor 11 so the flow of induced field current through the discharge resistor causes a voltage to appear to the input circuit 12 during the starting period of the motor. The frequency of the voltage is the same as the frequency of the voltage induced in the field winding and therefore is an indication of slip. The negative half cycles of the voltage appearing at the input of circuit 12 are clipped, while the positive half cycles are loaded to prevent destructively high voltages from appearing on the system. A speed sensing circuit 14 measures the frequency of the induced alternating current voltage in the motor field 4 while a trigger pulse forming circuit 16 forms a trigger pulse for each half cycle of the induced voltage. A controlled width pulse forming circuit 18 responds to the trigger pulses from the forming circuit 16 to provide a constant width and magnitude output pulse for each trigger pulse. The speed sensing circuit 14 and controlled width pulse forming circuit 18 are so arranged that the speed sensing circuit provides a steady state signal to a switching amplifier 20 until the slip of the synchronous motor reaches the predetermined slip value $S_1$. Upon attainment of the predetermined slip $S_1$ the speed sensing circuit 14 becomes inoperative and the only input to the switching amplifier 20 thereafter is the output in the form of controlled width pulses from the controlled width pulse forming circuit 18.

The switching amplifier 20 amplifies the input signals it receives and causes controlled energy input to a thermistor integrator 22. Upon the integral of the energy input to the thermistor integrator 22 reaching a predetermined value, a thermistor resistance measuring circuit 24 senses the occurrence and deenergizes the line contactor coil 26 thereby disconnecting the synchronous motor 2 from the power lines 6. The thermistor resistance measuring circuit 24 is adapted to receive a signal prior to energization of the motor and also to receive a signal when the motor is synchronized to insure that the protective circuit is operative only during acceleration of the motor. Of course, an "off" signal and "start" signal are also available to the line contactor coil 26 for starting and stopping the motor.

The overall operation of the illustrative embodiment shown in FIG. 2 is generally as described and claimed in the previously mentioned copending application. The present invention resides in the improvement of the pulse forming circuit 18 and the addition of the speed sensing circuit 14 to the overall damper winding protection scheme.

A schematic electrical diagram of the controlled width pulse forming circuit 18 and the speed sensing circuit 14 is shown in FIG. 3.

The speed sensing circuit 14 utilizes a logic function commonly known to those skilled in the art as the Nor logic function or Nor element. A Nor logic function is performed by the circuit apparatus which is adapted to provide an output in the absence of an input to the circuit apparatus. Should one input or more be present to the Nor logic function, then no output would result. For purposes of illustration, the Nor elements have been chosen to be responsive only to input signals of negative polarity. A flip-flop or Memory element is formed by the appropriate connection of a pair of Nor elements, the resulting Memory element is a bistable device which is capable of being triggered to assume one state and remain in that state even after removal of the triggering influence. The Memory element will assume its opposite state when an appropriate second input is applied to it and will remain in the opposite state even after removal of the second input. For a further description of the operation and characteristics of the Nor logic circuit and Memory logic circuit, reference is made to a publication entitled "Static Switching Devices" by Robert A. Mathias, in "Control Engineering," May 1957. Of course, any suitable form of Nor element or Memory element may be utilized by the speed sensing circuit 14.

From FIG. 2 it will be seen that the thermistor integrator 22 will respond to the output of the controlled width pulse forming circuit 18 and of the speed sensing circuit 14 and when a definite amount of energy is absorbed by the thermistor integrator 22, a signal will result in disconnecting the synchronous motor 2 from the power line 6.

The speed sensing circuit 14 is adapted to provide a constant energy input into the thermistor integrator 22 when the slip of the motor is greater than the predetermined value of slip $S_1$. The constant energy input resulting from the speed sensing circuit 14 will be calibrated so that an output from the thermistor integrator is had at the end of the allowable locked rotor time specified by the motor designer. Should the motor be subjected to locked rotor conditions longer than the allowable locked rotor time, the motor will be disconnected from the power source. Therefore, the speed sensing circuit 14 is operable to provide the first portion, $I_{d\infty}$, of the simulated curve shown in dotted lines in FIG. 1 or in other words, $$Q = I^2_{d\infty} R t_1$$

The constant portion of the simulated curve is attained by the speed sensing circuit 14 in the following manner. The clipped negative half cycles received from the input circuit 12 are allowed into the speed sensing circuit 14 by the rectifier 100. The negative half cycles of voltage charge the capacitor 102 which has connected across it an adjustable resistor 104. The side of the capacitor 102 opposite to the rectifier 100 is grounded at 106. A Nor element 108 is connected to receive the negative clipped pulses as an input. A Memory element 110 comprising a Nor element 112 and another Nor element 114 with criss-crossed inputs and outputs is connected to receive the output of the Nor element 108.

When power is supplied to the Nor elements, an "initial off" signal is applied to the Memory element 110 preventing an output therefrom. Another signal from the synchronizing circuitry or other suitable source turns the Memory element 110 "on" at the time power is connected to the synchronous motor 2.

The negative half cycle of voltage received by the speed sensing circuit 14 from the input circuit 12 charges the capacitor 102 constituting an input to the Nor element 108 and blocking its output. With no output received from the Nor element 108 the Memory element 110 will have a steady output signal to the thermistor integrator 22 (FIG. 2) hence, a constant energy input results thereto.

As long as the slip of the synchronous motor is large, the capacitor 102 is recharged by each negative half cycle of input voltage before it can discharge below the switching value of the Nor element 108. During this interval when the slip is greater than the preselected value $S_1$, the output of the Memory element 110 maintains a constant current through the thermistor integrator 22 and thereby simulates the first portion of the simulated damper current shown in FIG. 1.

When the slip of the synchronous motor decreases below the value of the preselected slip $S_1$ as determined by the setting of the variable resistor 104 across the capacitor 102, the capacitor 102 discharges during a positive half cycle of the input voltage when the rectifier 100 is blocking thereby allowing the Nor element 108 to have an output which turns the Memory element 110 "off." Hence, the constant energy input to the thermistor integrator 22 resulting from the output of the speed sensing circuit 14, ceases. At this time, the controlled width pulse forming circuit 18 takes over control of the switching amplifier 20 (FIG. 2).

The controlled width pulse forming circuit 18 is connected to receive sharp negative pulses for each half cycle of the induced voltage in the motor field 4 of the synchronous motor 2. One such form of trigger pulse forming circuit 16 is as shown and claimed in my previously mentioned copending application.

The controlled width pulse forming circuit 18 utilizes a transistor 200 and a transistor 300 in a monostable trigger arrangement. The emitter electrode 202 of the transistor 200 and the emitter electrode 302 of the transistor 300 are positively biased through a resistor 400. The collector electrodes 204 and 304 are negative biased through load resistors 206 and 306, respectively, to limit the collector current when the transistors are conducting. Resistor 208 and 308 provide a means for positive biasing and negative biasing of the base electrodes 210 and 310 of the transistors 200 and 300, respectively. A capacitor 402 connects the collector electrode 204 to the base electrode 310. An adjustable resistor 404 is connected in shunt with the capacitor 402.

The pulse forming circuit 18 normally has the transistor 200 biased "off" and the transistor 300 biased "on" so that the output through a resistor 406 is zero because the transistor 300 is conducting. A negative input pulse from the trigger pulse forming circuit 16 to the base electrode 210 of the transistor 200 causes the transistor 200 to conduct thereby forcing the capacitor 402 to discharge into the base electrode 310 of the transistor 300 making that transistor non-conductive. The result is a negative output through the resistor 406 which is amplified by the switching amplifier 20 (FIG. 2) with a resultant energy pulse through the thermistor integrator 22.

The capacitor 402 will continue to discharge even after the end of the trigger pulse received from the trigger pulse forming circuit 16 since the biasing on the emitter 202 of the transistor 200 keeps that transistor in its conductive state. Thus, the output through the output resistor 406 continues until the capacitor 402 discharges to a voltage too low to keep the transistor 300 conductive. The circuit then reverts to its original state. The effect is the generation of a pulse of the predetermined width for every half cycle of the slip frequency, or to put a definite quantity of energy into the thermistor each half cycle of slip frequency. The variable resistor 404 connected across the capacitor 402 is adjusted in conjunction with the variable resistor 104 across the capacitor 102 in the speed sensing circuit 14. Both variable resistors are adjusted in relation to a selected value of slip $S_1$ proper for the damper winding to be protected. The variable resistor 404 provides a parallel discharge path for capacitor 402 and thus regulates the width of the pulse generated by the controlled width pulse forming circuit 18. The variable resistor 404 may be set in advance to cause a pulse of a width nearly equal to the width of the half cycle of the induced current or voltage in the motor field when the slip of the sycnhronous motor equals the preselected value $S_1$ thereby insuring a continuous simulated damper current curve in the region of predetermined slip $S_1$ as may be seen in reference to FIG. 1.

Thus, by the addition of the speed sensing circuit 14 and the variable resistor 404 to the controlled width pulse forming circuit 18 of the damper winding protection scheme described and claimed in my copending application, maximum safe use of the synchronous motor capabilities is obtained. As a result of the present invention, the damper winding protection scheme much more closely simulates the actual damper winding current while overcoming the practical difficulties in obtaining a measurement of the damper winding itself. When the actual slip of the motor is in the area between a slip equal to 1.0 and the predetermined slip value $S_1$, a constant trip time is obtained as shown by the portion $I_{d\infty}$ of the simulated curve in FIG. 1. When the actual slip of the motor is less than the preselected slip $S_1$, the constant energy input to the thermistor integrator 22 as a result of the speed sensing circuit 14 is discontinued. At the same time, the controlled width pulse forming circuit 18 becomes operative in the damper protection scheme providing a constant pulse of energy to the thermistor integrator for each half cycle of the induced current in the field winding.

Thus, it can be seen that when the actual motor slip is greater than the predetermined slip $S_1$, energy is delivered to the thermistor integrator at a maximum or constant rate. For actual slip values less than the predetermined slip $S_1$, the rate of energy input to the thermistor integrator 22 is proportional to the slip as called for by the second term of Equation 1. The result is a circuit which closely simulates the actual current induced in the damper winding.

It is to be noted that the damper protection scheme illustrated is capable of "remembering" the time the motor runs at each slip and is capable of disconnecting the motor from the power lines when the integrated total exceeds the allowable maximum energy input to the damper windings. Also the circuit allows a shorter starting period on a successive start when the damper winding is still hot from the previous starting period.

Various modifications are possible within the spirit and scope of the present invention. While P-N-P transistors have been indicated, it is to be understood that N-P-N transistors may be used with proper changes in polarity. These alterations and substitutions are merely by way of example. Although a particular embodiment of the invention has been shown for the purpose of illustration, it is to be understood that the invention is not limited to this specific arrangement shown, but includes all equivalent embodiments, modifications and substitutions within the spirit and scope of the invention.

I claim as my invention:

1. A control system for a synchronous motor having a field winding and a damper winding, said system comprising thermal integrating means having thermal characteristics similar to the damper winding and being responsive to energy input therein, speed sensing means for providing a constant energy input to said thermal means when the slip of the motor is greater than a predetermined level, pulse forming means for providing an energy input pulse of constant magnitude and width for each half cycle of the induced current in the field winding when the slip of the motor is less than said predetermined level, said thermal means providing an output signal upon the integral reaching a predetermined magnitude.

2. A control system for a synchronous motor having a field winding and a damper winding, said system comprising thermal integrating means having thermal characteristics similar to the damper winding and being responsive to energy input therein, speed sensing means, said speed sensing means including a Nor element having an output in the absence of receipt of an input, a Memory element having an output dependent on the last of the plurality of inputs supplied to the Memory element and connected to receive the output from said Nor element, input means connected to said Nor element including capacitor means connected to be charged in response to each half cycle of the current induced in the field winding of a predetermined polarity and connected to discharge during the opposite half cycles when the slip is above a predetermined level, said capacitor means discharging to a level insufficient to provide an input to said Nor element when the slip is less than said predetermined level, pulse forming means for providing an energy input pulse of constant magnitude and width to said thermal integrating means for each half cycle of the induced current in the field winding when the slip of the motor is less than said predetermined level, circuit means responsive to the output of said Memory element for providing a constant energy input to said thermal integrating means, said thermal integrating means providing an output signal upon the integral reaching a predetermined magnitude.

3. A control system for a synchronous motor having a field winding and a damper winding, said system comprising thermal integrating means having thermal characteristics similar to the damper winding and being responsive to energy input therein, speed sensing means, said speed sensing means including a Nor element having an output in the absence of receipt of an input, a Memory element having an output dependent on the last of the plurality of inputs supplied to the Memory element and connected to receive the output from said Nor element, input means connected to said Nor element, including capacitor means connected to be charged in response to each half cycle of the current induced in the field winding of the predetermined polarity and connected to discharge during the opposite half cycles when the slip is above a predetermined level, said capacitor means discharging to a level insufficient to provide an input to said Nor element when the slip is less than said predetermined level, means for adjusting the rate of discharge of said capacitor means thereby controlling said predetermined level at which the Memory element switches outputs, pulse forming means for providing an energy input pulse of constant magnitude and width to said thermal integrating means for each half cycle of the induced current in the field winding when the slip of the motor is less than said predetermined level, circuit means responsive to the output of said Memory element for providing a constant energy input to said thermal integrating means, said thermal integrating means providing an output signal upon the integral reaching a predetermined magnitude.

4. A control system for a synchronous motor having a field winding and a damper winding, said system comprising thermal integrating means having thermal characteristics similar to the damper winding and being responsive to energy input therein, speed sensing means, said speed sensing means including a Nor element having an output in the absence of receipt of an input, a Memory element having an output dependent on the last of the plurality of inputs supplied to the Memory element and connected to receive the output from said Nor element, input means connected to said Nor element, including capacitor means connected to be charged in response to each half cycle of the current induced in the field winding of the predetermined polarity and connected to discharge during the opposite half cycles when the slip is above a predetermined level, said predetermined level of slip chosen to have a value between 2.0 and 2.5 times the slip of the motor at which maximum torque results, said capacitor means discharging to a level insufficient to provide an input to said Nor element when the slip is less than said predetermined level, pulse forming means for providing an energy input pulse of constant magnitude and width to said thermal integrating means for each half cycle of the induced current in the field winding when the slip of the motor is less than said predetermined level, circuit means responsive to the output of said Memory element for providing a constant energy input to said thermal integrating means, said thermal means providing an output signal upon the integral reaching a predetermined magnitude.

5. A control system for a synchronous motor having a field winding and a damper winding, said system comprising thermal integrating means having thermal characteristics similar to the damper winding and being responsive to energy input therein, speed sensing means for providing a constant energy input to said thermal means when the slip of the motor is greater than a predetermined level, pulse forming means for providing an energy input pulse of constant magnitude and width to said thermal means for each half cycle of the induced current in the field winding when the slip of the motor is less than said predetermined level, said pulse forming means including transistor means normally biased to have no output but connected to be responsive to an input pulse for providing an output, capacitive means connected to respond to said input pulse to maintain said output from the pulse forming means for a predetermined time after removal of said input pulse, said thermal integrating means providing an output signal upon the integral reaching a predetermined magnitude.

6. A control system for a synchronous motor having a field winding and a damper winding, said system comprising thermal integrating means having thermal characteristics similar to the damper winding and being responsive to energy input therein, speed sensing means for providing a constant energy input to said thermal means when the slip of the motor is greater than a predetermined level, pulse forming means for providing an energy input pulse of constant magnitude and width to said thermal means for each half cycle of the induced current in the field winding when the slip of the motor is less than said predetermined level, said pulse forming means being adapted so that each energy input pulse will have a time length equivalent to the time length of a half cycle of the induced current in the field winding at said predetermined level, said thermal means providing an output signal upon the integral reaching a predetermined magnitude.

7. A control system for a synchronous motor having a field winding and a damper winding, said system comprising integrating means having response characateristics similar to the damper winding and being responsive to energy input therein, speed sensing means for providing a constant energy input to said integrating means when the slip of the motor is greater than a predetermined level, pulse forming means for providing an energy input pulse of constant magnitude and width to said integrating means for each half cycle of the induced current in the field winding when the slip of the motor is less than said predetermined level, said pulse forming means including transistor means normally biased to have no output and responsive to an input pulse for providing an output, capacitive means connected to respond to said input pulse to maintain said output for a predetermined time after removal of said input pulse, means for adjusting the rate of discharge of said capacitor and thereby controlling the width of said energy input pulses, said integrating means providing an output signal upon the integral reaching a predetermined magnitude.

8. A control system for a synchronous motor having a field winding and a damper winding, said system comprising integrating means responsive to energy received for providing an output signal when the total energy received reaches a predetermined limit, speed sensing means operatively connected to said motor for delivering energy to said integrating means at a maximum rate when the slip of the motor is greater than the predetermined level, said speed sensing means delivering a rate of energy to said integrating means as a function of the slip of the motor when said slip of the motor is less than said predetermined level.

References Cited in the file of this patent
UNITED STATES PATENTS
2,811,678    Baude   ---------------- Oct. 29, 1957